United States Patent [19]

Bayan

[11] Patent Number: 4,810,752

[45] Date of Patent: Mar. 7, 1989

[54] HALOBUTYL THERMOPLASTIC ELASTOMER

[75] Inventor: Ghawamedin Bayan, West Chester, Pa.

[73] Assignee: The West Company, Phoenixville, Pa.

[21] Appl. No.: 194,894

[22] Filed: May 17, 1988

Related U.S. Application Data

[63] Continuation-in-part of Ser. No. 100,754, Sep. 24, 1987, abandoned.

[51] Int. Cl.$^4$ .................. C08L 53/00; C08L 53/02; C08L 15/02; C08L 23/12

[52] U.S. Cl. ........................................ 525/98; 525/166; 525/194

[58] Field of Search ............... 525/98, 166, 194, 232, 525/331.1, 332.7, 375

[56] References Cited

U.S. PATENT DOCUMENTS

| | | | |
|---|---|---|---|
| 3,104,235 | 9/1963 | Kuntz et al. | 525/375 |
| 4,130,534 | 12/1978 | Coran et al. | 525/232 |
| 4,501,842 | 2/1985 | Chmiel et al. | 524/432 |
| 4,593,062 | 6/1986 | Puydak et al. | 524/426 |
| 4,607,074 | 8/1986 | Hazelton et al. | 524/425 |
| 4,616,064 | 10/1986 | Zukosky | 525/131 |
| 4,639,487 | 1/1987 | Hazelton et al. | 524/425 |
| 4,728,692 | 3/1988 | Sezaki et al. | 525/74 |

OTHER PUBLICATIONS

Rubber World-Materials and Compounding Ingredients for Rubbers-05/75, p. 92.

*Primary Examiner*—Carman J. Seccuro
*Attorney, Agent, or Firm*—Eugene E. Renz, Jr.

[57] ABSTRACT

A thermoplastic elastomer composition is disclosed, comprising a halobutyl rubber cured by dynamic vulcanization with a multifunctional amine curing agent. The cure is effected in the presence of at least 20 parts of a mixture formed from 10 to 60 parts of a polyolefin and 1 to 90 parts of a thermoplastic elastomer. The parts based on 100 parts by weight of said rubber.

26 Claims, No Drawings

HALOBUTYL THERMOPLASTIC ELASTOMER

This application is a CIP of application Ser. No. 100,754 filed Sept. 24, 1987, now abandoned.

FIELD OF THE INVENTION

The present invention relates to a halobutyl-based dynamically vulcanized thermoplastic elastomer which can be used in the pharmaceutical industry for products such as vial stoppers, blood tube stoppers, dropper bulbs and syringe tips. The product does not employ a zinc containing component.

BACKGROUND OF THE INVENTION

Elastomeric composition in which butyl rubber is dynamically vulcanized in the presence of polyolefins such as polypropylene have resulted in thermoplastic compositions which have been proposed for use for most applications where thermoplastic elastomers would be of advantage. However, many of the products produced by the dynamic vulcanization of butyl rubber in the presence of materials such as polypropylene have not resulted in products which are suitable for vial stoppers, blood tube stoppers and dropper bulb applications, for example, in the pharmaceutical industry. Because of extremely high quality control and concern for the integrity of the product contained in pharmaceutical containers, thermoplastic elastomers have been slow to be accepted as candidates for container closures, vials, stoppers, dropper bulbs and the like. The product must have mechanical strength and set resistance properties, but also must provide moisture and oxygen barriers while not allowing undesirable materials to be extracted from the product. Until the present time, such a material has not been developed which has all of the required properties for use succesfully in the pharmaceutical industry.

U.S. Pat. No. 4,130,534 describes a thermoplastic composition containing polyolefin resins and cross-linked butyl rubber. The product is formed by dynamic vulcanization, in which the rubber is the continuous phase prior to cross-linking but becomes the dispersed phase after the cross-linking step.

U.S. Pat. No. 4,501,842 describes an adhesive in which a halogenated butyl rubber is combined with a styrene/ethylene butylene/styrene block thermoplastic polymer (SEBS) and other materials to form an effective adhesive. Zinc oxide is used as a strength increaser.

U.S. Pat. No. 4,593,062 describes the combination of polyolefins, halogenated butyl rubber and polychloroprene in which these rubbers are dynamically vulcanized in the presence of the polyolefin. This patent contains an extensive description of the dynamic vulcanization process.

U.S. Pat. No. 4,607,074 combines polypropylene, a zinc oxide cured halogenated butyl rubber, and a second rubber, preferably EPDM. Various curing agents are suggested for curing the rubber during dynamic vulcanization, including accelerators which assist the zinc oxide cure.

U.S. Pat. No. 4,616,052 describes elastomeric compositions which are used as stoppers and syringe plunger tips. The principal component of the product is a dynamically vulcanized ethylene-propylene-diene terpolymer and polypropylene mixed with butyl rubber in the range of perhaps 5 to about 20 percent. A hindered amine is present to act as a stabilizer.

U.S. Pat. No. 4,616,064 describes a mixture of polyolefins, SEBS polymers and materials such as polysiloxanes.

One particular method for preparing halogenated butyl rubbers through isomerization is described in U.S. Pat. No. 4,634,741. All of the cure processes for these butyl rubbers are based upon a zinc oxide cure system.

U.S. Pat. No. 4,639,487 describes a different system using a butyl rubber mixed into an ethylene copolymer resin which is dynamically vulcanized. The preferred curing agent contains zinc oxide.

None of the systems described above are capable of providing the ideal composition for use in the pharmaceutical industry. Accordingly, it is an object of this invention to provide a thermoplastic elastomer composition which is suitable for use as a vial stopper, blood tube stopper, dropper bulb or syringe tip in the pharmaceutical industry and which is useful in other appications where low hardness and a good barrier to moisture and oxygen is needed.

SUMMARY OF THE INVENTION

The present invention provides a thermoplastic elastomer composition in which a halobutyl rubber is cured by dynamic vulcanization. A multifunctional amine curing agent is employed. The cure is effected in the presence of a mixture formed from polyolefins and thermoplastic elastomers. These compositions have properties which are highly desirable for use in the pharmaceutical industry, and are zinc free.

Specifically, the present invention comprises a halobutyl rubber which is cured by dynamic vulcanization, using a multifunctional amine curing agent, such that the cure is effected in the presence of at least 20 and preferably from about 20 to about 100 parts of a mixture formed from about 10 parts to 60 parts of a polyolefin and about 1 to about 90 parts of a thermoplastic elastomer. All of the parts are based on 100 parts by weight of the halobutyl rubber.

The preferred polyolefins are polypropylene and polyethylene. The preferred thermoplastic elastomers are thermoplastic, elastomeric block copolymers having terminal polystyrene units.

DETAILED DESCRIPTION OF THE PREFERRED EMBODIMENT

As is noted in U.S. Pat. No. 4,634,741, one of the first olefinically unsaturated synthetic elastomers to be commercially produced ws butyl rubber. The expression butyl rubber is broadly understood to be the product made from a copolymerization of isobutylene and isoprene. For the purpose of this invention, any of the butyl rubbers which are commercially available may be used in the composition of this invention. Halobutyl rubbers are those butyl rubbers which have been halogenated with either chlorine or bromine. Again, the commercially available halogenated butyl rubbers are suitable for use in the present invention.

The concept of dynamic vulcanization of butyl rubbers and polyolefins is extensively described in U.S. Pat. No. 4,130,534 to Coran et al, the disclosure of which is incorporated herein. Described therein are definitions of butyl rubber and halogenated butyl rubber. Also described are various thermoplastic olefin resins such as polyethylene, and polypropylene, among others. Polypropylene is the preferred polyolefin of the present invention. Based upon 100 parts of the halobutyl rubber, the amount of polyolefin will range from about 10 to about 60 parts by weight. Most preferred are about 15 to about 30 parts polypropylene per 100 parts of rubber. Also preferred is polyethylene in the same proportions.

The thermoplastic elastomer of the present invention, which forms the final component of the thermoplastic elastomer is present in an amount ranging from about 1.0 to about 90 parts of thermoplastic elastomer based upon 100 parts of the halobutyl rubber. Preferred is from about 18 to about 50 parts of thermoplastic elements. A most preferred amount is from about 15 to about 35 parts by weight. The thermoplastic elastomer is combined with the polyolefin to form a mixture which forms the continuous phase during the dynamic vulcanization of the halobutyl rubber. Prior to crosslinking, the butyl rubber is the continuous phase and the polyolefin and thermoplastic elastomers are added. During crosslinking of the halobutyl rubber, it becomes dispersed and, upon vigorous mixing, becomes particulate throughout the continuous phase of the mixture of polyolefin and thermoplastic elastomer. Normally, from about 25 to about 160 parts of mixture is needed per 100 parts of rubber.

Various thermoplastic elastomers may be employed with success in the present invention. Particularly preferred are thermoplastic elastomeric block copolymers having terminal polystyrene units. Most preferred are the ethylene, butylene, block copolymers which have terminal polystyrene units and which functional as thermoplastic elastomers. These polymers are commercially available from Shell Chemical Company under the trademark KRATON G. Block copolymers described in U.S. Pat. No. 3,686,364 and U.S. Pat. No. 33,865,776 are typical examples of the block copolymers contemplated by the present invention. In the latter patent, assigned to Shell Oil Company, copolymers are described as having ethylene butylene central blocks of from 50 to 80 percent by weight of the copolymer molecule in approximately equal proportions of ethylene and butylene. The terminal blocks are polystyrene. These ethylene, butylene block copolymers having terminal polystyrene units are referred to by the shorthand designation of SEBS copolymers. SEBS copolymers are the preferred thermoplastic elastomer which is to be used to form a mixture prior to dynamic vulcanization of the halobutyl rubber. Other thermoplastic elastomeric block copolymers with terminal polystyrene units are also preferred. Among these are butylene polymers and isobutylene polymers, referred to by SBS and SIS. These are also available under the trademark KRATON.

Another class of thermoplastic elastomers which is useful in the present invention is the group generally known as olefinic thermoplastic elastomers. These products are available commercially.

A third class of thermoplastic elastomers which is useful in the present invention is based on a multiplicity of recurring short-chain ester units and long-chain ester units joined through ester linkages. These polyester resins are available, for example, from the DuPont Company under the tradename HYTREL.

There are, of course, other thermoplastic elastomers which may be employed in the present invention. All that is necessary is that the thermoplastic elastomer be suitable for forming a continuous, though not necessarily homogeneous, phase in a mixture with the polyolefin during the dynamic vulcanization stage.

The dynamic vulcanization of the halobutyl rubber is carried out with a multifunctional amine curing agent. The curing agent, containing a diamine function, is very active, normally considered far too fast for straight vulcanization. Any diamine function which is slow enough to be mixed into the system and fast enough to react during dynamic vulcanization is appropriate. Stated another way, if a diamine curing agent can be incorporated into the system, it can operate to dynamically vulcanize the halobutyl rubber. One preferred curing agent is hexamethylene diamine carbamate, which is blocked diamine having carbon dioxide blocking the amine function to form a carbamate. When heated, carbon dioxide is driven off to immediately cause a reaction during the dynamic vulcanization. Materials of this type are available under the tradename DIAK. DIAK is manufactured by the DuPont Company.

The amount of curing agent will be that amount necessary for a complete cure of the halobutyl rubber and will broadly range from less than one part to more than 6 parts of curing agent per 100 parts of halobutyl rubber. For bromobutyl rubber, the diamine can range from 1 phr to 3 phr, with a preferred range of 1.6 to 2.5 phr. For chlorobutyl rubber, 2 to 6 phr has been effective, and 3 phr to 5 phr is preferred. The exact amount of diamine will be sufficient to effect the cure without detrimental effects of overcure.

A number of experiments were performed to demonstrate the efficacy of the present invention. In one series of experiments, dynamic vulcanization of bromobutyl rubber was effected using 2 parts per 100 parts of bromobutyl rubber of a hexamethylene diamine carbamate curing agent. The amount of polyolefin and thermoplastic elastomer were varied, and various properties were measured. Specifically, compression set, 100% modulus, tensile strength, and hardness were measured. Presented below in Table 1 are the results of those tests.

TABLE I

| Experiment No. | Polypropylene phr | SEBS phr | Compression set | 100% modulus psi | Tensile psi | Hardness Shore A |
|---|---|---|---|---|---|---|
| 1 | 25 | 33 | 25 | 282 | 1285 | 55 |
| 2 | 22 | 33 | 16 | 280 | 725 | 53 |
| 3 | 18 | 33 | 18 | 253 | 615 | 52 |
| 4 | 10 | 10 | 15 | 348 | 480 | 50 |
| 5 | 20 | 20 | 22 | 575 | 1070 | 65 |
| 6 | 40 | 40 | 31 | 645 | 1700 | 77 |
| 7 | 60 | 60 | 37 | 770 | 2080 | 85 |
| 8 | 80 | 80 | 47 | 720 | 2250 | 86 |
| 9 | 50 | 30 | 41 | 730 | 1580 | 82 |
| 10 | 50 | 10 | 33 | 845 | 1830 | 86 |
| 11 | 30 | 50 | 51 | 490 | 810 | 67 |
| 12 | 10 | 50 | 70 | 225 | 390 | 49 |
| 13 | 50 | — | 33 | 840 | 1900 | 86 |

Various other components making up the continuous phase mixture were evaluated and results are summarized in Table II below. Specifically, polyethylene and polypropylene were both evaluated as the polyolefin, based on 100 parts of bromobutyl rubber and 2 parts of DIAK 1 curing agent. Various thermoplastic elastomers were also used at a 40 parts per 100 parts of rubber level. SEBS was used with both polypropylene and polyethylene. Also, tested were two polyesters.

TABLE II

| Experiment No. | Polyolefin phr | TPE phr | Compression set | Tensile psi |
|---|---|---|---|---|
| 14 | polypropylene, 40 | SEBS, 40 | 31 | 1700 |
| 15 | polyethylene, 40 | SEBS, 40 | 40 | 800 |

TABLE II-continued

| Experiment No. | Polyolefin phr | TPE phr | Compression set | Tensile psi |
|---|---|---|---|---|
| 16 | polypropylene 40 | Polyester, 40 | 39 | 850 |
| 17 | polypropylene, 40 | Polyester, 40 | 38 | 900 |

The experiments shown below in Table III demonstrate that both bromobutyl and chlorobutyl rubber may effectively be employed in the process of this invention. In both cases, a mixture of 40 parts of polypropylene and 40 parts of SEBS were employed as a continuous phase. Dynamic vulcanization was effected using 2 parts of DIAK 1 for bromobutyl and 5 parts DIAK 1 for the chlorobutyl experiment.

TABLE III

| Experiment No. | Rubber 100 parts | Polyolefin, and TPE | Hardness, Shore A | Tensile, psi | Compression set |
|---|---|---|---|---|---|
| 18 | bromobutyl | 80 parts | 77 | 1700 | 31 |
| 19 | chlorobutyl | 80 parts | 70 | 1100 | 51 |

As shown in Table IV below, in which the amount of hexamethylene diamine carbamate was varied. For bromobutyl rubber, a preferred range is 1.6 to 2.5 parts of the multifunctional amine such as shown in Table IV.

TABLE IV

| Experiment No. | DIAK 1 phr | Tensile psi | Compression set | Hardness Shore A |
|---|---|---|---|---|
| 20 | 1.0 | 520 | 65 | 62 |
| 21 | 1.5 | 520 | 76 | 56 |
| 22 | 1.67 | 970 | 23 | 66 |
| 23 | 2.0 | 1250 | 22 | 70 |
| 24 | 2.2 | 1010 | 23 | 66 |

Shown below in Table V are experiments using 2 parts per 100 parts of rubber of 4 curing agents, except for experiment 28 which used 2.5 phr.

TABLE V

| Experiment No. | Curing agent at 2 phr | Tensile psi | Compression set | Hardness Shore A |
|---|---|---|---|---|
| 25 | DIAK 1 | 1700 | 31 | 77 |
| 26 | DYTEK A | 1400 | 37 | 74 |
| 27 | Tetraethylene pentamine | 1600 | 40 | 75 |
| 28 | Polyethylene polyamine (2.5 phr) | 1850 | 37 | 76 |

Finally, presented below in Table VI are various pharmaceutical properties and functionally of a preferred embodiment of the present invention which was shown in Experiment 1 in Table I. This product compares favorably with a standard commercially available butyl based thermoset product manufactured by The West Company. Thermosets, of course, cannot be reprocessed.

TABLE VI

Pharmaceutical Closure Properties Comparison

| | Invention | Standard |
|---|---|---|
| Compression set, % | 25 | 13 |
| Autoclave set, % | 80 | 14 |
| Moisture vapor transmission (g/m²/day) | 0.4 | 0.65 |
| Oxygen transmission (cc/m²/day) | 287 | 214 |
| pH shift | −0.3 | −0.3 |
| Turbidity (Nephelos units) | 7.0 | 2.0 |

TABLE VI-continued

Pharmaceutical Closure Properties Comparison

| | Invention | Standard |
|---|---|---|
| Reducing agents (ml of 0.01 N I) | 0.01 | 0.01 |
| Total extractables (mg) | 1.4 | 0.6 |
| Heavy metals, ppm lead and zinc | 0.0 | 0.0 |
| Toxicity, acute systemic | non | non |
| Toxicity, intracutaneous | non | non |
| Toxicity, cytotoxicity | non | non |
| Coefficient of friction | 47 | 65 |
| Needle penetration, mg | 364 | 342 |
| Reseal | acceptable | acceptable |
| Freezer leaks | none | none |
| Vacuum retention, in Hg | 21 | 21 |
| Swelling, sesame oil, % | 5 | 16 |
| Swelling, cotton oil, % | 5 | 10 |
| Swelling, mineral oil, % | 91 | 82 |

Presented in Table VII are additional experiments on which other thermoplastic elastomeric block copolymers having terminal polystyrene units are shown to be very effective embodiments of the present invention. Both SBS and SIS demonstrated effectiveness in preparations which are useful thermoplastic elastomer composition. All of these products had 100 parts of bromobutyl rubber and 2 parts of DIAK 1 curing agent.

TABLE VII

| Experiment No. | Polypropylene phr | TPE phr | Compression set | 100% modulus psi | Tensile psi | Hardness Shore A |
|---|---|---|---|---|---|---|
| 29 | 40 | SBS, 40 | 56 | 570 | 1400 | 75 |
| 30 | 40 | SIS, 40 | 59 | 590 | 1360 | 75 |

As can be seen, a variety of useful compositions can be prepared according to the present invention, particularly for use in the pharmaceutical industry. The above formulations have been made into pharmaceutical products such as vial stoppers, blood tube stoppers, dropper bulbs, syringe tips and the like.

CLAIMS

Having thus described the invention, what is claimed is:

1. A thermoplastic elastomer composition comprising:
a halobutyl rubber cured by dynamic vulcanization with a multifunctional amine curing agent, said cure being effected in the presence of at least 20 parts of a mixture formed from 10 to 60 parts of a polyolefin and 1 to 90 parts of a thermoplastic elastomers selected from the group consisting of polyesters and block copolymers having terminal polystyrene units and olefin elastomeric mid block units, said parts based on 100 parts of said rubber.

2. The composition of claim 1, wherein said thermoplastic elastomer is selected from the group consisting of SEBS and polyesters.

3. The composition of claim 2, wherein the amount of said thermoplastic elastomer ranges from about 18 to about 50 parts.

4. The composition of claim 3, wherein said thermoplastic elastomer is SEBS.

5. The composition of claim 1, wherein said polyolefin is polypropylene.

6. The composition of claim 5, wherein the amount of said polypropylene ranges from about 15 to about 30 parts.

7. The composition of claim 1, wherein said halobutyl rubber is bromobutyl rubber.

8. The composition of claim 1, when said curing agent is a blocked diamine curing agent.

9. The composition of claim 8, wherein said blocked diamine is a carbon dioxide hindered diamine.

10. The composition of claim 9, wherein said curing agent comprises hexamethylene diamine carbamate.

11. A thermoplastic elastomer composition comprising:
a halobutyl rubber cured by dynamic vulcanization with a diamine curing agent, said cure being effected in the presence of 30 to 65 parts of a mixture formed from 15 to 30 parts of polypropylene and 15 to 35 parts of a thermoplastic elastomeric block copolymer having terminal polystyrene units and olefin elastomeric mid block units, said parts being based on 100 of said rubber.

12. The composition of claim 11, wherein said thermoplastic copolymer is SEBS.

13. The composition of claim 11, wherein said halobutyl rubber is bromobutyl rubber.

14. The composition of claim 11, wherein said blocked diamine is a carbon dioxide hindered diamine.

15. The composition of claim 14, wherein said diamine is hexamethylene diamine carbamate.

16. A thermoplastic elastomer composition comprising:
a bromobutyl rubber cured by dynamic vulcanization with a diamine curing agent, said cure being effected in the presence of 30 to 65 parts of a mixture formed from 15 to 30 parts of a polypropylene and 15 to 35 parts of SEBS, said parts based on 100 parts of said rubber.

17. The composition of claim 16, wherein said diamine is hexamethylene diamine carbamate.

18. A thermoplastic elastomer composition comprising:
a halobutyl rubber cured by dynamic vulcanization with a multifunctional amine curing agent, said cure being effected in the presence of at least 20 parts of a mixture formed from by 10 to 60 parts of a polyolefin selected from polypropylene and polyethylene and 1 to 90 parts of a thermoplastic elastomeric block copolymer having terminal polystyrene units and olefin elastomeric mid block units, said parts based on 100 parts of said rubber.

19. The composition of claim 18, wherein said block copolymer is SEBS.

20. The composition of claim 19, wherein the amount of said SEBS ranges from about 18 to about 50 parts.

21. The composition of claim 19, wherein said polyolefin is polypropylene.

22. The composition of claim 21, wherein the amount of said polypropylene ranges from about 15 to about 30 parts.

23. The composition of claim 18, wherein said halobutyl rubber is bromobutyl rubber.

24. The composition of claim 18, wherein said curing agent is a blocked diamine curing agent.

25. The composition of claim 24, wherein said blocked diamine is a carbon dioxide hindered diamine.

26. The composition of claim 25, wherein said curing agent comprises hexamethylene diamine carbamate

* * * * *